(12) United States Patent
Tsinberg et al.

(10) Patent No.: US 9,210,352 B2
(45) Date of Patent: Dec. 8, 2015

(54) AUDIO VIDEO INSTRUCTION FORMAT SWITCHER

(71) Applicants: Mikhail Tsinberg, New York, NY (US); Ilsoo Yu, Fort lee, NJ (US); Leon Glenn Tsinberg, Bronx, NY (US)

(72) Inventors: Mikhail Tsinberg, New York, NY (US); Ilsoo Yu, Fort lee, NJ (US); Leon Glenn Tsinberg, Bronx, NY (US)

(73) Assignee: KEY DIGITAL SYSTEMS, INC., Mount Vernon, NY (US)

( * ) Notice: Subject to any disclaimer, the term of this patent is extended or adjusted under 35 U.S.C. 154(b) by 153 days.

(21) Appl. No.: 13/630,798

(22) Filed: Sep. 28, 2012

(65) Prior Publication Data
US 2014/0092314 A1    Apr. 3, 2014

(51) Int. Cl.
| | |
|---|---|
| *G06F 13/12* | (2006.01) |
| *G06F 13/38* | (2006.01) |
| *H04N 5/44* | (2011.01) |
| *H04L 12/64* | (2006.01) |
| *H04N 21/41* | (2011.01) |
| *H04N 21/4363* | (2011.01) |
| *G09G 5/00* | (2006.01) |

(52) U.S. Cl.
CPC ............ *H04N 5/44* (2013.01); *G09G 5/006* (2013.01); *H04L 12/6418* (2013.01); *H04N 21/4122* (2013.01); *H04N 21/43635* (2013.01); *G09G 2340/02* (2013.01); *G09G 2340/0442* (2013.01); *G09G 2370/10* (2013.01); *G09G 2370/12* (2013.01)

(58) Field of Classification Search
None
See application file for complete search history.

(56) References Cited

U.S. PATENT DOCUMENTS

| | | | |
|---|---|---|---|
| 2005/0165967 A1* | 7/2005 | Woolgar | 710/1 |
| 2005/0168658 A1* | 8/2005 | Woolgar et al. | 348/734 |
| 2010/0157169 A1* | 6/2010 | Yoshida et al. | 348/734 |

FOREIGN PATENT DOCUMENTS

EP    2101485 A1 *   9/2009    ............ H04L 12/28

\* cited by examiner

*Primary Examiner* — Elias Mamo
(74) *Attorney, Agent, or Firm* — Arent Fox LLP

(57) ABSTRACT

A high definition multimedia interface using a modified format switcher for controlling electronic hardware. The modified format switcher enables infrared, RS-232, TCPIP, audio, and consumer electronics control interconnection with the high definition multimedia interface.

4 Claims, 10 Drawing Sheets

AUDIO VIDEO INSTRUCTION FORMAT SWITCHER

BACKGROUND OF THE INVENTION

1. Field

The invention relates to devices for controlling audio, video devices.

2. Description of the Related Art

Devices used to control audio, video content data have numerous uses for audio, video systems ranging from simple home theater systems control to complex industrial multi monitor system matrix control. These systems require either an external wire such as category five, wired to a large amount of monitors or configuration of a wireless network in order to control the functionality of the sources to devices. Many installers use multiple wires to transmit infrared commands to sources via some sort of control device such as a remote control, touchpad, laptop, tablet, or computer.

Even in such industrial or commercial environments with numerous audio, video sources and monitors, the User would require control of each display device in order to display audio video content on numerous displays. There is therefore a need for a new control medium for the operator of an audio video system.

High definition multimedia interface designed a line to accommodate a consumer electronics control standard.

Consumer electronics control is a command protocol designed primarily for intra-hardware communication. The purpose of consumer electronics control includes functional intercommunication between hardware sources exemplified as commands translated into English as, "stop displaying DVD at the end of the disc, and switch to main menu at the end of movie." Such intra-hardware communication takes many forms but emanates primarily from an audio video source to an audio video source. Direct consumer control is secondary to hardware control in the consumer electronics control system.

Therefore modulated consumer electronic control commands would be unaffected by adding a distinctive infrared signal which can be read by appropriate receiving hardware in order to control a complex audio video system. Software or hardware modifications can be utilized in order to drive infrared and consumer electronics control contemporaneously. Infrared can take the form of band pass frequency whiles consumer electronics control can take the form of low pass frequency in the disclosed invention.

SUMMARY OF THE INVENTION

The invention consists of a device which receives control commands from an input port from a plurality of switchers which is connected to a multiplexer by connective circuitry. In the preferred embodiment, the multiplexer is a format switcher. In either case the multiplexer coupled with at least an input port is configured to communicate at least an instruction signal to control at least an audio video parameter of at least one of the plethora of devices. The reception of command packets, in the preferred embodiment, ultimately conveys at least an instruction signal by infrared data packets vis-a-vis some initial command medium, preferable consumer electronics control. The medium can take varying forms of consumer electronics control including consumer electronics control coupled with seven halves, bidirectional audio medium or other bidirectional medium. Bidirectional medium is defined by a medium encapsulating at least one wire and possible two. The device then transmits primary command packets coupled with secondary command packets to multiplexing circuitry which combines the basic infrared frequencies with consumer electronics control frequencies and transmits via the exemplary medium a variant signal which is either routed or modulated. Multiplexing circuitry can include switching circuitry which can be configured to switch formats instead of multiplexing formats. The modulated frequency travels to a multiplexer or switcher circuit. The device combines band pass command packets with low pass command packets to a command platform router or secondary switcher. The variant signal is either: multiplexed, added, or switched in order to send basic a primary standard, preferably infrared, to audio video systems via medium which transmits intra hardware to hardware communication commands via the exemplary medium. The preferred standard is adjusted by User enabled settings, in the preferred embodiment, as either infrared or consumer electronics control.

Modern audio video control manufacturers alter control platforms on audio video devices over medium which is multi-platform capable. The effect has been to slow the progress of control system development and take away control from a user in favor of a machine. More particularly, consumer electronics control platforms have had an effect on the marketplace of forcing users to implement additional hard-line solutions for multi platform standards when one exemplary medium will do.

Before Abraham Lincoln decreed the national railway system have standard track sizes, regional railroad companies employed varying track sizes which had an effect of limiting total railroad traffic across the entire country.

The present invention allows multi platform control protocols to implement user commands over a single high definition multimedia interface. To analogize this with Abraham Lincoln's wise decree, the tracks have already been built but the railcar can traverse any track so long as its basic design complies with track parameters. In regards to future tracks, or command platform cables, less hardwire can be replaced by multiplexing or timed switching techniques described by the present invention. The analogy to the present invention is, the track is a control medium, and the railcar is the command packet. By inventing a device which controls a plethora of audio video devices on at least one consumer electronics control line, control systems can evolve by enhancing the number of commands a User can generate whilst increasing the complexity of macro command software programming. It can also reduce the need for subsequent media in favor of a single or multi platform medium.

Imagine a computerized world without basic unified platforms. There would be no advance in computer science because only the most basic computer programs could be written by only the most specialized computer scientists. This is the world of modern day hardware control. The present invention unifies command platform standards and enables single, medium execution of at least an instruction signal.

The origin of these commands will stem from the control protocols produced by every audio video manufacturer including, but not limited to, push button controls. In the preferred embodiment, infrared will be chosen as the primary standard because the data packets are universally known and adopted within the audio video industry. Secondary consumer electronics control media, intra-hardware communication, will also be possible in a contemporaneous manner with infrared command control, and can be set as the primary control standard by the disclosed invention.

DETAILED DESCRIPTION OF THE INVENTION

The disclosed invention solves the first problem of controlling audio video devices over the emerged standard medium of consumer electronic control. In the preferred embodiment, infrared command packets take precedence over other command packets to control a plethora of devices.

Figure 1:
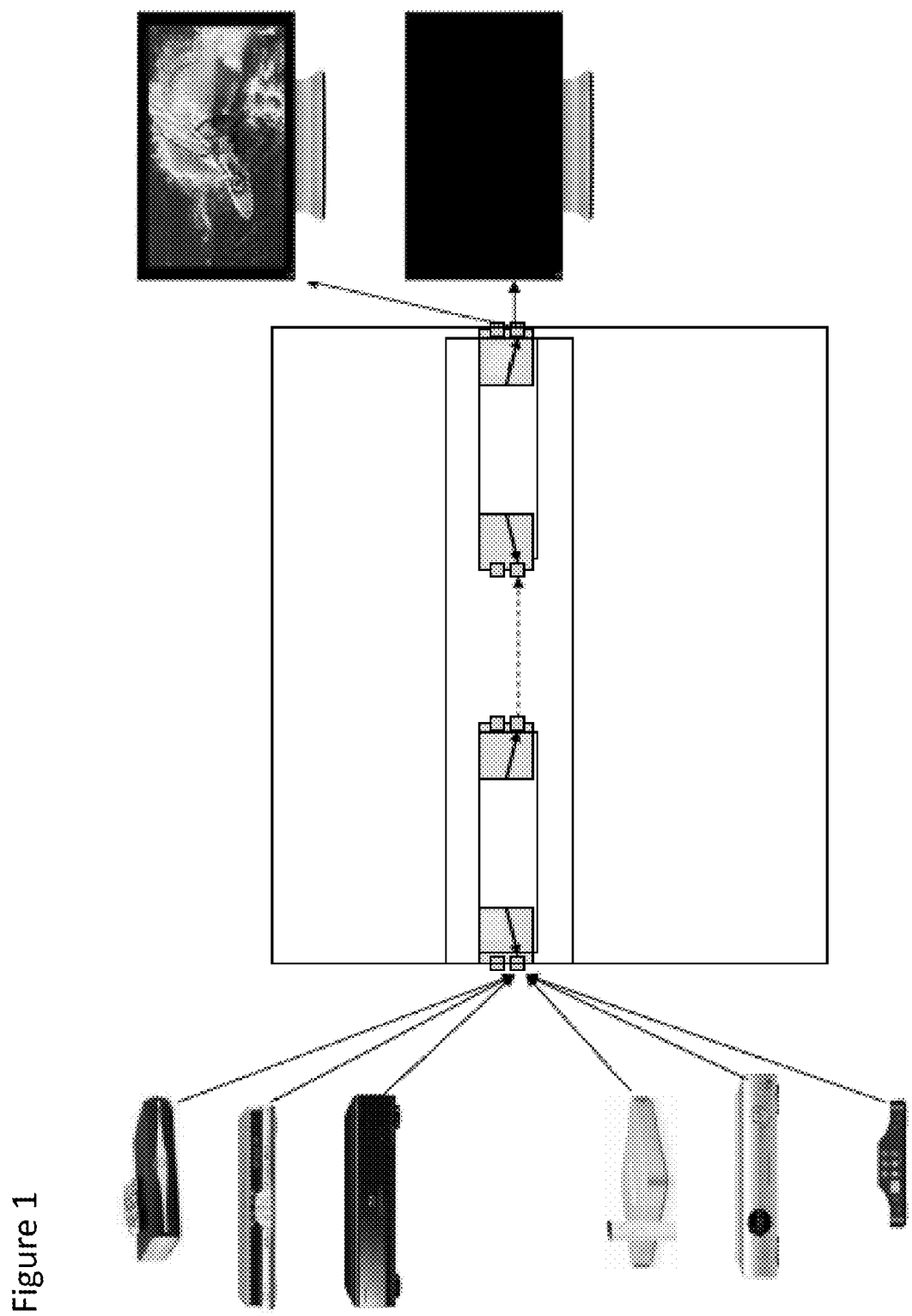
FIG. 1 is a depiction of the first embodiment of the disclosed invention for controlling a plurality of components using a format switch to convey multiple format connectors to and from an input port over an exemplary consumer electronics control medium.

FIG. 1 is a depiction of the first embodiment of the disclosed invention for controlling a plurality of components using a format switch to convey multiple format connectors to and from an input port over an exemplary consumer electronics control media; first comprises a format switcher 10 integrated upon a port 20 further integrated upon connective circuitry 30. In the first embodiment of the disclosed invention the port is a manual switch. The manual switch is configured to select an exemplary format connector coupled with the format's respective data packets first comprises means for selecting between an infrared format connector, a consumer electronics control format connector, a 3.5 mm or seven halves millimeter format connector, a universal serial bus format connector, a high definition multimedia interface format connector, a remote control five format connector, a category five format connector, a category six format connector, a recommended standard two hundred thirty two format connector, a three dimensional video audio high definition multimedia interface format connector, a digital audio pulse code modulation format connector, a composite video format connector, low band pass frequency format connector, band pass frequency format connector, high band pass frequency format connector, high frequency band format connector, low frequency band format connector, or registered jack forty five format connector 40.

FIG. 1, is a depiction of the first embodiment of the disclosed invention for controlling at least one of a plethora of components using a format switch to convey multiple format connectors to and from an input port over an exemplary consumer electronics control medium; first comprises a format switcher; second comprises connective circuitry 30 configured to route at least an instruction signal, an instruction signal conveying each a data packet. The data packets configured to control at least an audio video parameter.

The method for routing comprises the steps of selecting a format conveyed on one of the format connectors. In the first embodiment, the format connector carries a variant data pack, variant upon the position of the manual format switcher. The format switcher is disclosed in either a mono 3.5 mm format of stereo 3.5 mm format.

The preceding disclosed device has enabling instructions for data packet information to receive instruction signals to the respective device. This publication comes in the form of inclusive remote controls or instruction manuals included with every device, standard in the audio video industry. These publications specify the control method of the device so that it can be used to either control, provide content for, or display pixels on an audio video device. Of note, most devices can operate basic functions with push button controls. These push button controls also send data packets. Standard industry operation of audio video devices includes remote control capability in some form and can reasonably be expected of by purchasers of audio video devices.

Persons having ordinary skill in the remote control art can customize data packets to instruct multiple devices with multiple codes by what is known as macro command programming, usually encapsulated within a format. Macro commands can take the form of a singular format such as infrared, or consumer electronics control. In the first described embodiment, the chosen format is selected, and routed.

The method of routing comprises the further step of conveying the format over an exemplary medium such as consumer electronics control. The exemplary medium can be bidirectional, meaning there is at least a wire embedded within a medium coupled with a time variable multiplexer such that a device can communicate back and forth with another device to convey at least an instruction signal. The instruction signal can include authentication instructions. Some formats have data packets configured for unidirectional conveyance, such as infrared, to merely send instruction signals to a device without in a unidirectional manner. Bidirectional conveyance is defined as controlling hardware from source to sink or from sink to source.

The format switches is manually set to a certain format connector integrated upon the format router through connective circuitry in order to create a hardwire connection to the exemplary medium. Physically this is accomplished by streaming the selected format's datapackets within the exemplified medium, exemplified by the first embodiment as consumer electronics control. In the case of multiple wires encapsulated within a format connector, such as recommended standard two hundred thirty two, the manual switch will combine all the wires of that standard into one wire and electrically connect a buffer which sets a variable time delay pause so that each command packet can stream over the exemplary medium. This combining method can be mechanically accomplished by the manual switcher.

Figure 2:
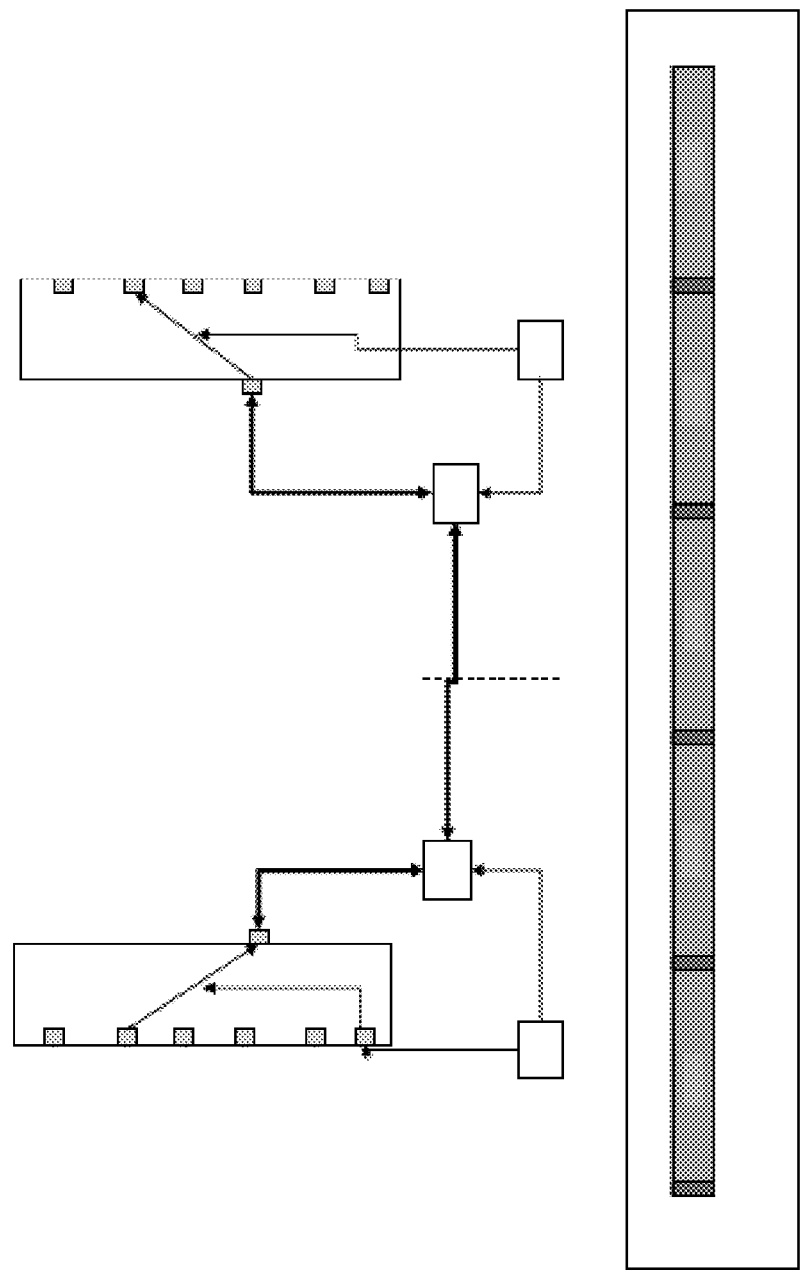
FIG. 2 is a depiction of the second embodiment of the disclosed invention for controlling a plurality of components using a multiplexer coupled with a modulator for sending a variant signal by transcribing command packets. This schematic also depicts a packetizing method for routing multiple data packets coupled with headers. An exemplary data platform is shown below.

FIG. 2 is a schematic view of a circuit in accordance with a second embodiment of the present invention. The method of routing a unidirectional format can take a bidirectional form insofar as format which requires only one medium can be streamed along in one direction along the medial axis while the other unidirectional format can be streamed along the same medial axis in parallel 40. The medial axis is defined by at least consumer electronics control medium, and in the exemplified case as a consumer electronics control medium integrated with a typical bidirectional audio cable such as a seven halves audio cable. This dual, parallel stream can take the form of two streams travelling in the same direction or two streams travelling in the opposite direction. In either case, one is unaffected by the other. Consumer electronics control media only uses a small fraction of the consumer electronics control medium for streaming data packets. Like Interstate Ninety westbound in Montana on a typical Wednesday at two in the morning, the highway is straight, open, and designed to carry many more vehicles then actually used. Consumer electronics control media typically streams four hundred sixteen bits per second at normal frequency conditions of four hundred sixteen Hertz. This defines the band as a low band signal. The actual consumer electronics control medium is capable of streaming upwards of two mega bits per second at standard construction parameters. Depending on the actual construction of the cable; including such factors as capacity volume, shielding, and crimping, consumer electronics control media uses only two and a half tenths of a milli (approximately 25 milli parts) fraction of its capability. The format switcher is able to physically combine at least any one format to the consumer electronics control medium by means of at least one multiplexing method, infra described as a manual switch 20. The disclosed invention solves the second problem of installing more format cables then is necessary in a consumer electronics control enabled audio video installation.

FIG. 2 is a schematic view of a circuit in accordance with a second embodiment of the present invention first comprises a multiplexer 50 for packetizing data packets by organizing the data packets into an exemplary data platform. Organizing data packets into a data platform is accomplished by writing unique headers attributable to each data packet, advancing data packets in a preset priority order, encoding data packets into a variant platform, packetizing data packets using a variable time delay method, and modulating data packets into the original format provided to the format switcher 60. The variant platform can be data packets combined by precedent headers transcribed upon the original data packets ordained from a primary format preset.

Depending upon the type of data packet received, the format switcher either conveys the primary data packet to a device which is modified to read such a data packet; or multiplexes the data packet into a variant platform. When the format switcher multiplexes the data packets, the first method of command packet multiplexing is known as data packet packetizing by a time delay method. This method creates an appropriate current of data packets in order to route the variant platform over medium originally designated for only a singular bidirectional format. This medium is exemplified in the first embodiment as consumer electronics control.

The first multiplexing method uses a time variable data packetizing method. Command headers are written before each command packet. The exemplary multiplexer tabulates data packets with command headers. These Command headers are at least two bits of binary code. Exemplary command headers for the infrared platform use a command header "1, 1". Of note, the binary language reads the comma as a variant pause. In the exemplified case, the two bits of binary information told the receiving device that the first data packet in the first format had followed. Different command headers precede different data packets that differentiate data packets with a byte, or in the exemplified case, by at least two bits. The multiplexer uses a clocking mechanism which inserts differing pauses or commas to differentiate each command packet. This multiplexer is known as a time variable data packetizing multiplexer. This is accomplished by a header inserter coupled with a header reader microchip 51. This microchip is integrated upon the multiplexer which also integrates the controller for a User to select the mode the multiplexer should take 52. The variant platform signal 55 travels along the medial axis 40 to a de-multiplexer 60 which reads the variant platform 55 through a header inserter reader microchip 56 which is integrated upon the format switcher. The total control parameters are controlled from this side by another controller 57.

An exemplary result of the packetizing method is a variant command platform 55. The variant command platform is exemplified as the end result of a process and by no means the only variant signal. Based on the controller 52 or 57 the variant signal can change but a variant signal is hereby described by 55 with reference being made to the input and output of the various command packets. 55*a* is an infrared data packet; 55*c* is a recommended standard two hundred thirty two data pack; 55*e* is a consumer electronics control data packet, 55*i* is a digital audio data packet. Preceding each data packet is a command header. 55*b* is an infrared header; 55*d* is a recommended standard two hundred thirty two header; 55*f* is a consumer electronics control header, 55*j* is a digital audio header.

Figure 3:
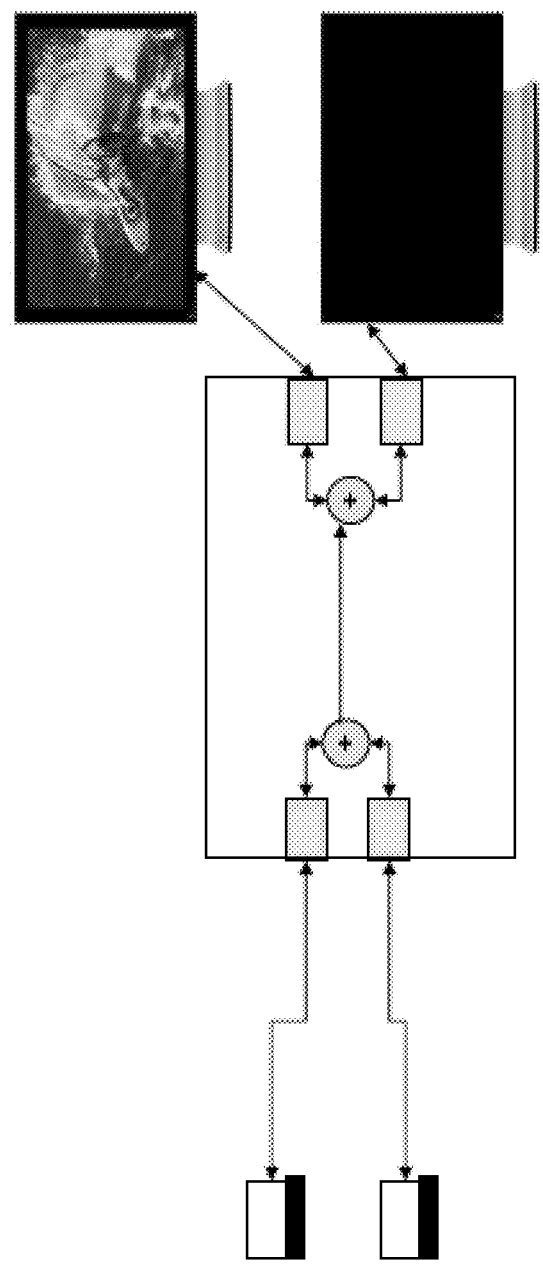
FIG. 3 is a depiction of the third embodiment of the disclosed invention for controlling a plurality of components using a multiplexer coupled with a de-multiplexer for sending a variant signal by filtering low band data packets from high band data packets whilst routing both data packets based on ordained data packet preference modes.

Once the variant platform travels to the switcher the reader 56 extrapolates which command packet is being sent and switches the prioritized command packets to a format exemplified by the following list. 55*k* is an infrared format; 55*l* is a recommended standard two hundred thirty two format; 55*o* is a digital audio format; 55*p* is a composite video format; 55*q* is a consumer electronics control format, FIG. 3 is a schematic view of a circuit in accordance with a third embodiment of the present invention first comprises a unidirectional frequency variable multiplexer 70 for combining data packets into a variant platform and filtering the variant platform into at least a format.

The frequency variable multiplexing method uses a frequency variable command packetizing method. Command packets ordinarily travel at a frequency designated for the original medium of which the command packets could physically travel. In the case of infrared frequency, infrared command packets travel at a frequency which was calculated to be the maximum pulse rate imitable by a light emitting diode coupled with media interference caused by over-the-air broadcast. Depending on the strength of the diode, the distance the format must travel, and the environmental conditions, an established frequency was ordained for the infrared platform. Other platforms would take into account the strength of the data packet transmitter, the type of medium used to transmit, and the data degradation rate, to ordain respective frequency standards.

The frequency standard for infrared established to take into account the basic use of infrared data packet communication over the air. As different mediums were established for this command protocol standard, such as wired standards for infrared, the standard frequency remained the same because the final correspondence of infrared command packets typically took the form of a light emitting diode vis-à-vis an infrared receiving port. Exemplified formats have standard command packet frequency emissions. In this case, the time variable multiplexing method with a frequency multiplexing method.

The unidirectional frequency multiplexing method comprises the steps of receiving a preset primary high band format of at least a data packet for unidirectional conveyance; acquiring secondary low band format of at least a data packet for unidirectional conveyance; filtering the high band from the low band format; routing the high band format to a high band connector; and channeling the low band format to a low band format connector.

Reference to the various signals will now be made. 65a is a low band format signal such as consumer electronics control. 65b is a high band format signal such as infrared.

Reference to the internal components will now be made. 70a is a low pass filter. 70b is a band pass filter. 70c is a reversible bidirectional adder.

Figure 4:
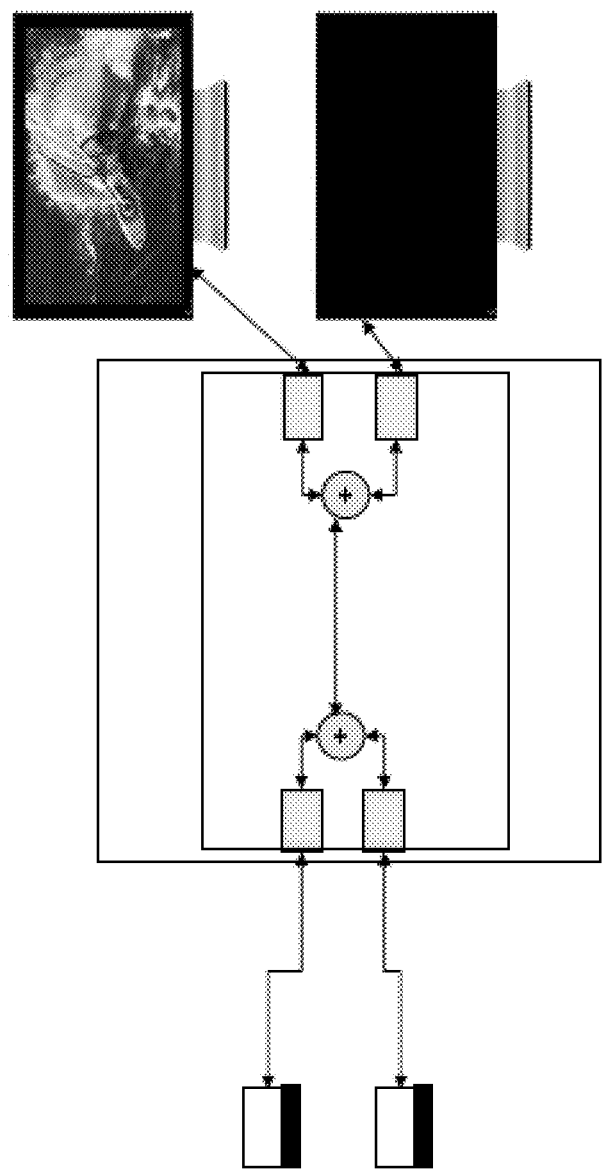
FIG. 4 is a depiction of the fourth embodiment of the disclosed invention for controlling a plurality of components using a multiplexer coupled with a de-multiplexer for sending a bidirectional variant signal by filtering low band data packets from high band data packets whilst routing both data packets based on ordained data packet preference modes.
Figure 5:
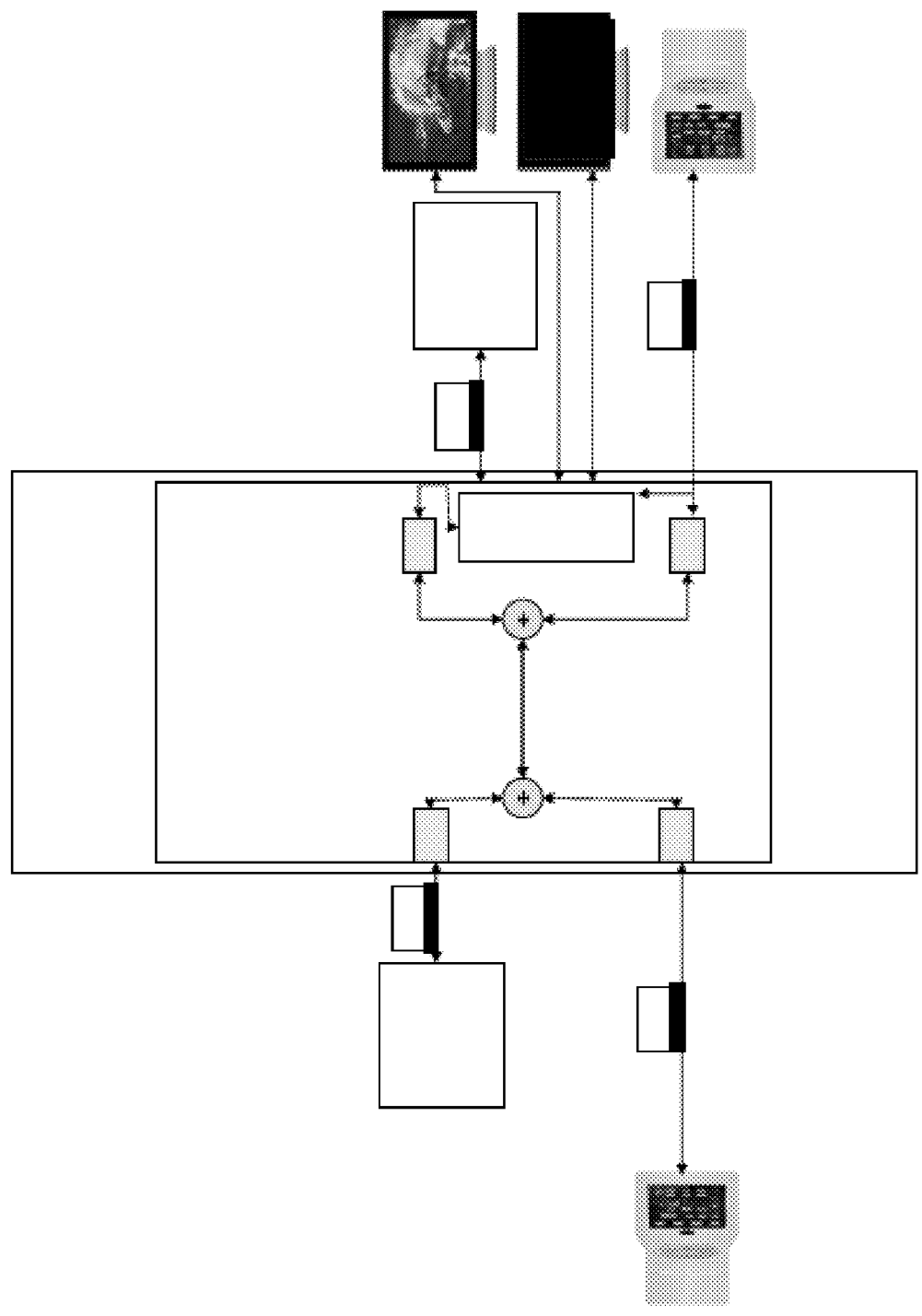
FIG. 5 is a depiction of the fifth embodiment of the disclosed invention for controlling a plurality of components using a multiplexer coupled with a de-multiplexer for sending a bidirectional variant signal, the bidirectional variant format including authentication parameters for a unidirectional format for coupling with a defined bidirectional format.

FIG. 4 is a schematic view of a circuit in accordance with a fourth embodiment of the present invention first comprising a bidirectional frequency variable multiplexer 80 for combining data packets into a variant platform and filtering the variant platform into at least a data packet.

The bidirectional frequency variable multiplexing method comprises the steps of receiving a preset primary high band format of at least a data packet for parallel conveyance; acquiring a secondary low band format of at least a data packet for unidirectional conveyance; filtering the high band from the low band format; routing the high band format to a reversible bidirectional adder; channeling the low band format to a reversible bidirectional adder; summing the high band format with the low band format; exuding the high band from the low band format; funneling the high band format to a high band format connector; and traversing the low band format to a low band format connector.

The frequency variable multiplexer can be connected with the format switcher 90 a command platform to at least one of a plurality of devices. The format switcher is set to read combinations of data packets which are indexed by packets of command headers. The multiplexer can be set to transmit primary instruction headers to the format switcher. An exemplary command platform includes at least a command packet preceded by a command header wherein the format includes the formats accompanied with the format connectors exemplified in FIG. 1. The format switcher can be set to receive primary instruction packets. Packetized command headers are ordained by the preferred embodiment, primary instructions packets include infrared instruction packets.

The frequency variable multiplexer unconnected with the format switcher is an exemplary reversible bidirectional adder integrated on a port modified to convey an exemplary format over other formats. The frequency variable multiplexer is a command receiver and a command transmitter. The receiver can absolve variant command platforms into at least one distinct command platform by combining variant command platforms with a reversible bidirectional adder. The connective circuit filters variant command platforms into standard command platforms. Exemplary filters include, varying bandwidth filters, band pass filters, low pass filters, low to high bandwidth filters, low to high frequency band pass filters, high to low band pass filters. These filters isolate command platforms. Exemplary narrow band command platforms include consumer electronics control bands, whilst exemplary broad band command platforms include infrared control band. This filtration separates at least one distinct command platforms from a variant command platform. In the best mode, the reversible bidirectional adder is coupled with a band pass filter and a low pass filter.

The frequency variable multiplexer is a transceiver. In order to transmit a command packet to either one of the plurality of devices or to a reversible bidirectional adder, the receiver is a format switcher. Exemplary variant command signals include, infrared coupled with consumer electronics control, recommended standard two hundred thirty two coupled with consumer electronics control, digital audio pulse code modulation coupled with consumer electronics control, Dolby digital audio coupled with consumer electronics control, composite video coupled with consumer electronics control, three dimensional video audio high definition multimedia interface coupled with consumer electronics control, or multiplexed command packets coupled with consumer electronics control.

The frequency variable multiplexer is at least a receiver which uses the same method to decouple a platform into a data packet as the transmitter which can take the elements of the following list of exemplary embodiments. The frequency multiplexer is an exemplary instructional signal variant format switcher coupled with a reversible bidirectional adder. The frequency variable multiplexer is a bandwidth command format switcher coupled with a reversible bidirectional adder. The multiplexer is an exemplary band pass switcher coupled with a reversible bidirectional adder.

The problem is how to implement a multi format audio video system through the exemplary medium? Hardware modification routing can be performed by a format router which can take the form of embedded hardware or a device firmware upgrade.

Figure 6:
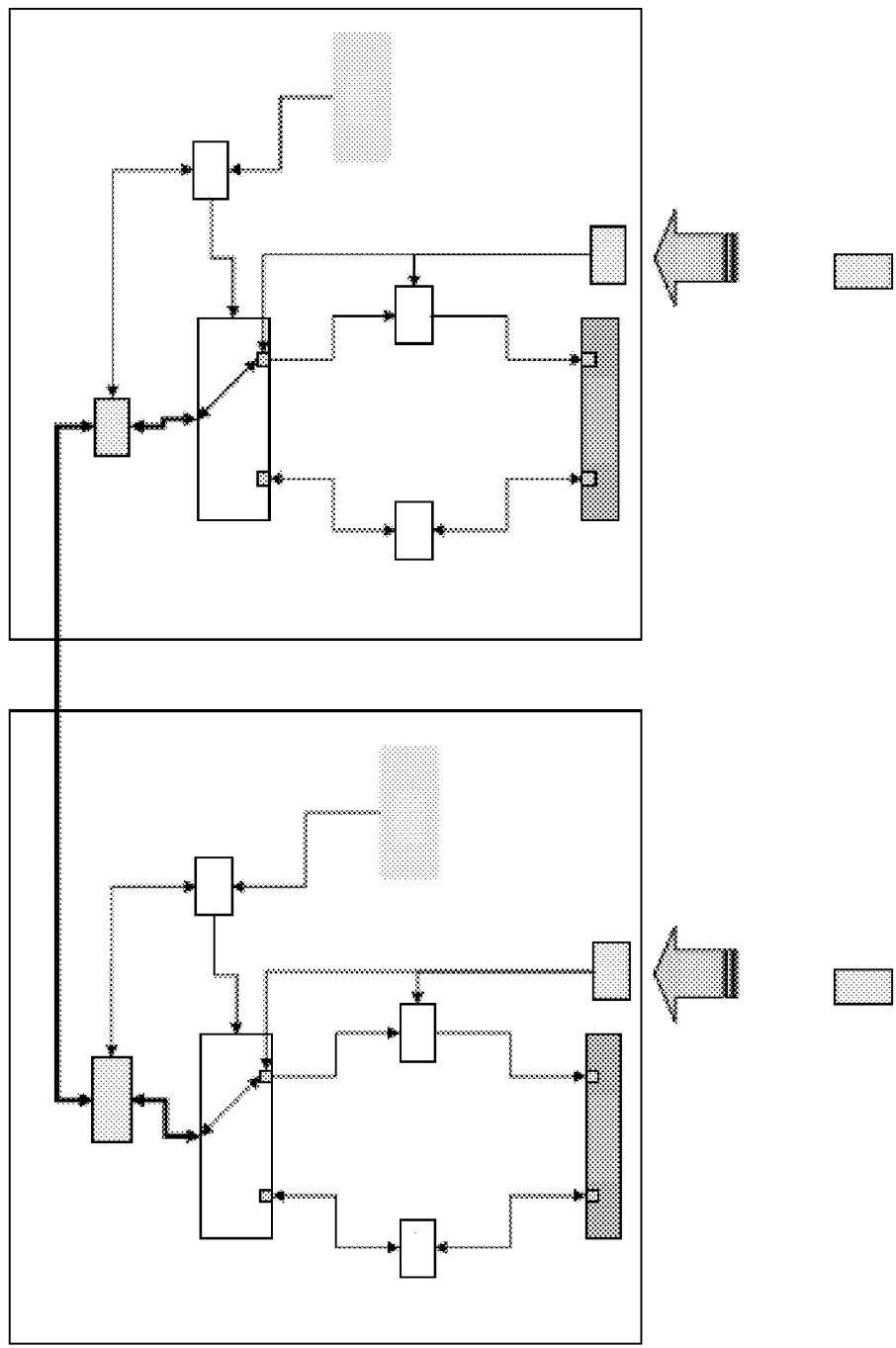
FIG. 6 is a depiction of the sixth embodiment of the disclosed invention for controlling a plurality of components using a command platform router is integrated upon the connective circuit to traverse at least a data packet to its appropriate hardware driver.

FIG. 6 is a schematic view of firmware embedded within the connective circuitry modified to generate at least a command data packet. This comprises the steps of: configuring an primary format, a low band format, or an infrared format; setting an secondary format, a low band format, or a consumer electronics control format; receiving a primary format or primary format concurrent with secondary format; deciding to route selected formats over secondary or primary routes; adding the primary or secondary format; routing the variant format to a consumer electronics control transceiver; rerouting the secondary consumer electronics control format to device or signal decider; coupling the secondary control format with the primary control format; separating the primary control format; and transmitting the primary control format to hardware.

Reference will now be made to additional depictions of an exemplary consumer electronics control device 201.

Figure 7:
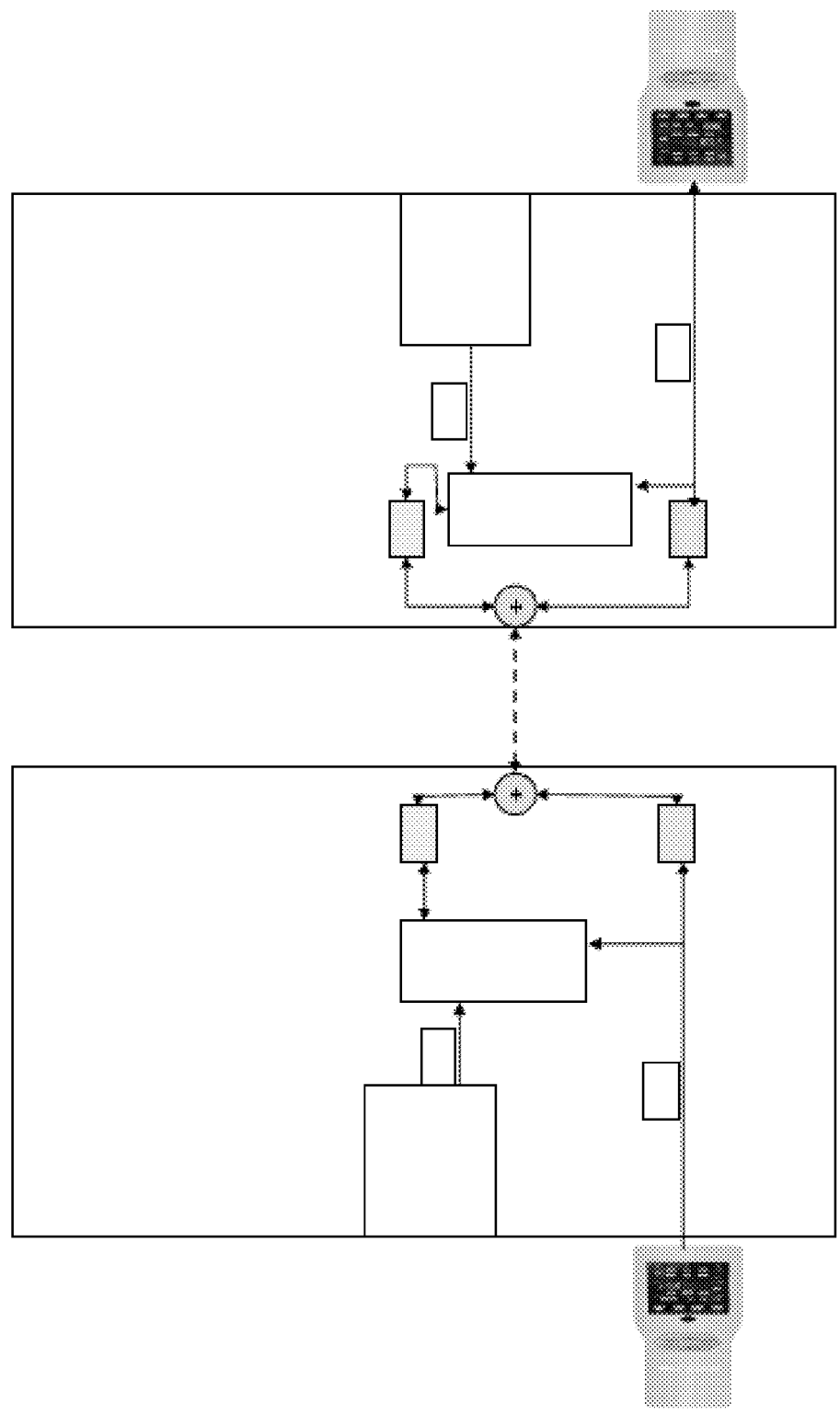
FIG. 7 is a depiction of the fifth embodiment of the disclosed invention for controlling a plurality of components using firmware process embedded within a hardware driver integrated upon a microprocessor to reconfigure said hardware driver to route consumer electronics control media coupled with infrared control media over a consumer electronics control medium.

FIG. 7 is a schematic view of a circuit in accordance with a seventh embodiment of the present invention. The routing method is exemplified by uploading firmware to a device's hardware for synchronizing exemplary consumer electronics control packets with exemplary infrared control packets. The respective device hardware is modified by firmware to accept primary command packets in concurrence with secondary command packets. In the best mode, the primary command packets are integrated within an infrared format whereas the secondary command packets are integrated within a consumer electronics control format and routed through the consumer electronics control medium.

The source and display modification is identical and symmetrical. The source and display encapsulates the devices. Line 370 is hardware connecting the format switcher. Both consumer electronics control and infrared commands are traveling on this line bi-directionally. The hardware driver 470 translates physical data present on the line for the firmware in the system as well as translates software commands to physical data on the consumer electronics control medium coupled with infrared media 370. Original setting of system configuration is performed by a format switcher 360. The format switcher sends commands to a switch control module 350 to operate in the best mode in either consumer electronics control or infrared mode. Upon reception of either command packet, the switch control module issues either command packets to a consumer electronics control medium coupled with infrared media switcher 300 through a connection 390. The switch control module 350 is also sending a unique command via connection 380 to hardware driver 470. The hardware driver 470 translates that unique command to hardware data unique command that is send through consumer electronics control medium coupled with infrared media 370 to corresponding hardware driver 470 of attached display or source. That unique command is subsequently interpreted by the hardware driver that sends appropriate instruction to switch control module 350.

The Switch control module then sets consumer electronics control media coupled with infrared media switch 300 through connections 390 in proper configuration to be consumer electronics control or infrared. That system of unique control command allows source and display to be in complete synchronicity regarding consumer electronics control or infrared mode regardless which format platform is selected on the format switch.

The exemplary device configured by firmware routes infrared command packets concurrently with consumer electronics control command packets comprising the steps of: converting to software command packets to a multiplexed standard by variable time delay or frequency modulation means defined infra, routing the software command packets to a format switches protocol, executing infrared process algorithms to adjust audio video parameter, delivering the multiplexed standard to a consumer electronics control coupled with infrared switcher protocol, sending the variant signal via consumer electronics control medium to a format switches protocol, passing the secondary consumer electronics control algorithm to hardware to control authentication parameters.

The prioritization of consumer electronics control media over consumer electronics control medium is accomplished by setting the format switcher 360 to consumer electronics control mode. If the system is set in consumer electronics control mode the consumer electronics control medium coupled with infrared media switch 300 is in consumer electronics control position. All the data from consumer electronics control process algorithm module 310 is communicated through communication line 430 bi-directionally to hardware driver 470 and subsequently through consumer electronics control medium coupled with infrared media 370 communicating variant command platform to the device hardware driver. Consumer electronics control data packets can also communicate to all the hardware execution drivers whilst receiving instruction signals in a two way manner as between the devices 330 via communication line 410.

The exemplary device configured by firmware routes consumer electronics control packets as a primary standard and infrared command packets as a secondary standard comprises the steps of switching modes between consumer electronics control or infrared; converting to software command packets to a multiplexed standard, routing the software command packets to a format switches protocol, executing consumer electronics control process algorithms to adjust audio video parameter, delivering the multiplexed standard to a consumer electronics control coupled with infrared switcher protocol, sending the variant signal via consumer electronics control medium to a format switcher protocol, passing the secondary infrared algorithm to hardware to control authentication parameters.

The prioritization of infrared media over consumer electronics control medium is accomplished by setting the format switch to infrared mode. If the system is set in infrared mode the consumer electronics control media coupled with infrared media switch 300 is in infrared position. All the data from infrared process algorithm module 320 receiving its communication through line 440 from a hardware driver 470 that is delivered by consumer electronics control medium coupled with infrared media and consumer electronics control media 370 from the corresponding hardware driver of the display or source. The infrared process algorithm 320 is also communicating to the hardware and receiving instruction signals to and from the display or the source hardware 330 via communication line 420. The infrared system encompasses their remote control as well. The infrared remote control 460 generates an infrared signal 450 that is picked up by an infrared sensor 340 in the source or the display device. The signal is converted to software command packets and communicated via line 400 to infrared process algorithm processes 320 that executes each incoming infrared command packet as designated by the variant platform. The infrared command packets travel from the infrared sensor 340 which is also delivered to consumer electronics control of infrared switch module 300 to the terminal of that switch. These command packets are sent to the hardware driver 470 that interprets subsequent transmission via consumer electronics control media coupled with infrared media 370 for corresponding hardware driver information 470 of the connected source or display. The infrared signaling is one directional by definition which can take the modified form of bidirectional implementation with bidirectional software or hardware, such as RS232. The infrared process algorithm only executes infrared command packets when received from either the input port via connecting line 400 or from consumer electronics control medium coupled with infrared media which is switched by virtue of the format switcher port 440. These commands intended for the connected source or display are generated by an infrared remote 460, picked up by an infrared sensor 340, communicated via communication line 400 to consumer electronics control medium coupled with infrared media format switcher 300, sent to hardware driver 470 and through consumer electronics control medium coupled with infrared media to connected hardware driver 470 for final connection of the exemplary devices.

The exemplary device configured by firmware routes infrared command packets as a primary standard and consumer electronics control command packets as a secondary standard comprises the steps of: switching modes between consumer electronics control or infrared; converting to software command packets to a multiplexed standard, routing the software command packets to a format switcher protocol, executing infrared process algorithms to adjust audio video parameter, delivering the multiplexed standard to a consumer electronics control coupled with infrared switcher protocol, sending the variant signal via consumer electronics control medium to a format switcher protocol, passing the secondary consumer electronics control algorithm to hardware to control authentication parameters.

Reference will now be made to the exemplary devices in accord with the embodiment. 300a is a consumer electronics control enabled source. 300b is a consumer electronics control display.

Figure 8:
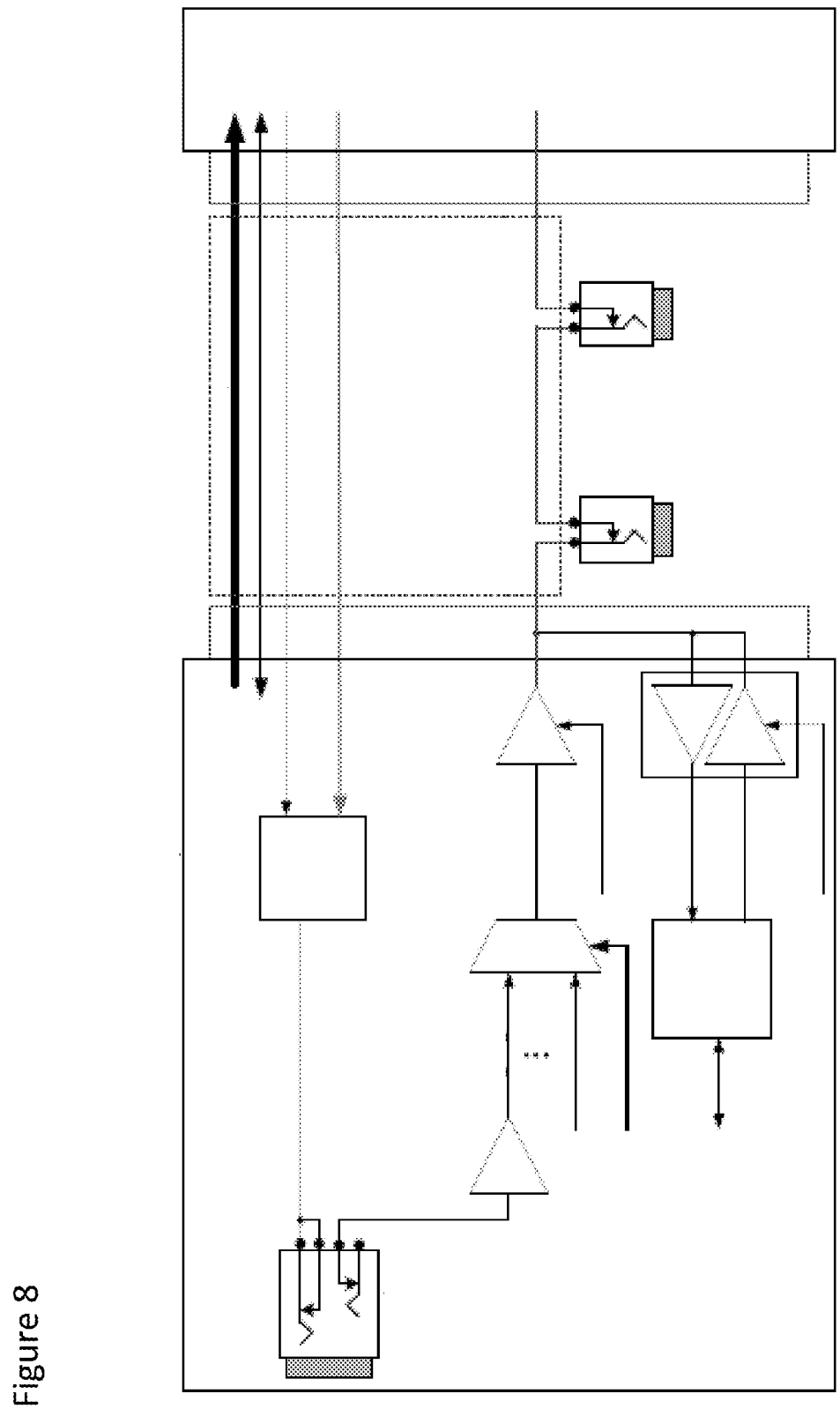
FIG. 8 is a schematic view of a circuit in accordance with an eighth embodiment of the present invention wherein two command platform routers are integrated upon two ports wherein both command platform routers are integrated upon connective circuitry to traverse at least a data packet to its appropriate hardware driver in either direction along the medial axis.

FIG. 8 is a schematic view of a circuit in accordance with an eighth embodiment of the present invention first comprises a second command platform router 500 is integrated upon the format switcher. The second command platform router is configured to convey bidirectional variant formats to route to the devices. The method for routing is the same except for which direction the command format or variant command format travel.

Figure 9:
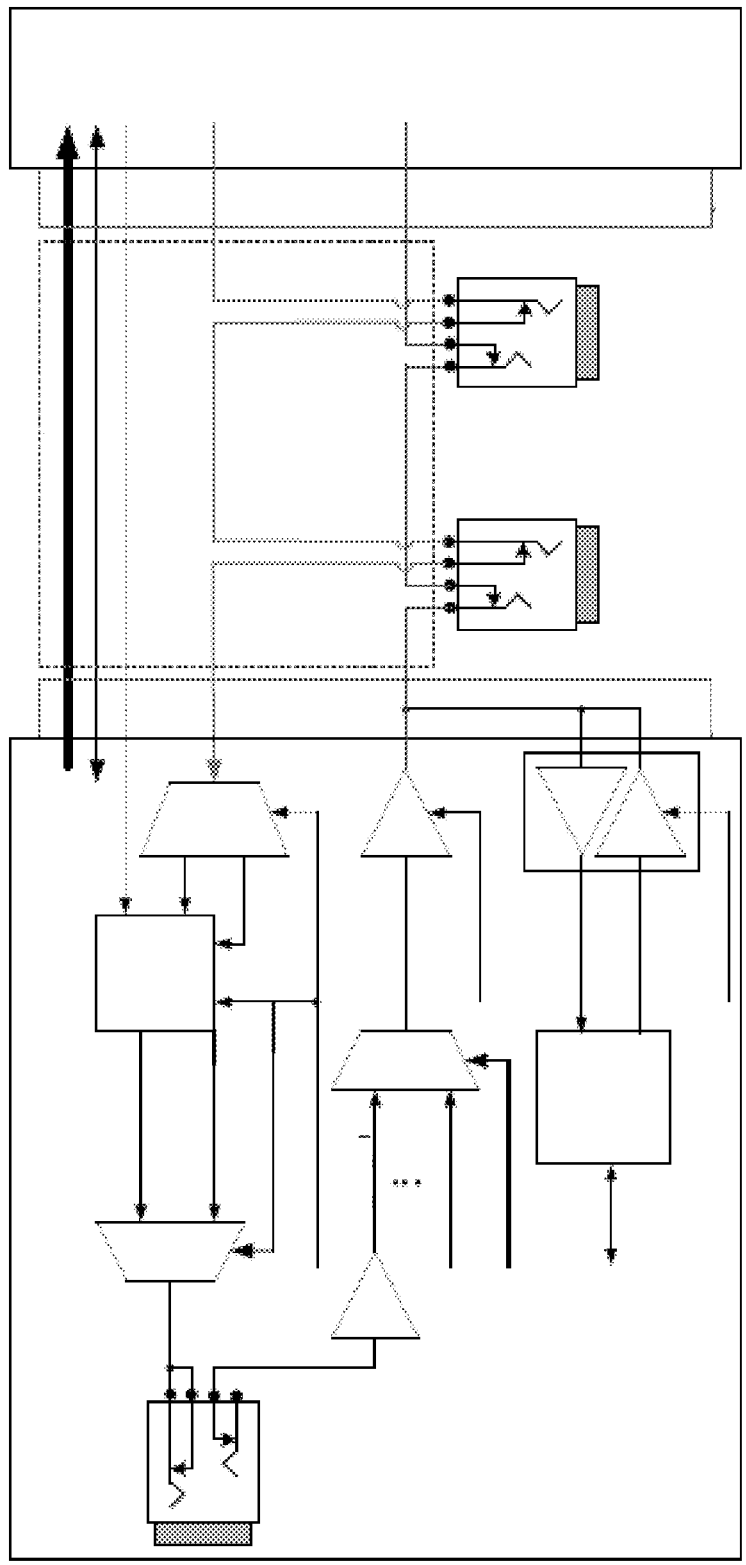
FIG. 9: Is a schematic view of a ninth embodiment of the disclosed invention wherein a command platform router is integrated upon connective circuitry connected with a variant format high definition multimedia interface modified by at least a mono audio format switcher, the mono audio format switcher electrically connected with a port capable of insertion upon the modified high definition multimedia interface.

FIG. 9: Is a schematic view of a ninth embodiment of the disclosed invention wherein a command platform router is integrated upon connective circuitry connected with a variant format high definition multimedia interface modified by at least a mono audio format switcher, the mono audio format switcher electrically connected with a port capable of insertion upon the modified high definition multimedia interface. 501 is connective circuitry integrated with a port modified for insertion upon a variant high definition multimedia interface. The port an medium, capable of insertion with a medium carrying standard at least a command packet, command packet media, in which a high definition multimedia interface is connected upon the port connected with a is a 3.5 millimeter stereo audio phone jack. 510 is a display modified with a command input port, the command input port a gateway for standard audio video command platforms of at least a data command packet. The modified command input port is a multiple platform capable command input port wherein the at least a data packet of at least a command platform, which includes the list of, infrared command platform, RS-232 command platform, TCPIP command platform, Dolby digital audio command platform, digital audio command platform, and composite video command platform; are platform command packets on which the multiple platform capable command input port has interface with. 520 is an audio return channel (ARC) decoder chip integrated upon connective circuitry which is integrated with a I/O 3.5 mm stereo phone expansion jack. The audio return channel (ARC) decoder is a transcriber of at least a data command pack traversing amongst the HEAC line of the high definition multimedia interface. The at least a data command pack traversing amongst the HEAC line of the high definition multimedia interface is a derivative control signal encoded upon the signal which is encoded by the standard interference parameters of the receiving derivative lines of the high definition multimedia interface. The HEAC ARC control line derivative receiving signal (RxD) is a derivative return signal (RxD) propagated by standard medial interference of the ARC HEAC medium is present upon format switcher configuration described by the placement of the manual mono format switcher in a given position wherein the RxD line is propagated commensurate with the ARC HEAC media, the configurations described by the table in the drawing herein referenced. The said derivative transmission signal of reception is present upon the mono audio format switcher configuration disclosed in the referenced table, 600, is a table of connections pathways taken within the high definition multimedia interface variant upon the position of the switch. The pathways associated with the positions of the switch is described in the table. The first column show the control pathway taken when both switches are in the two (2) position. When the format switcher is set into the 2 position on either side of the format switcher, integrated upon the high definition multimedia interface, the source is set to sink to the high definition multimedia interface. The second column describes when the first format switcher is set to the two (2) position and the second format switcher is set to the one (1) position. In this event, the source is set to the control format of the second format switcher. The third column describes the control pathways taken when the first format switcher is set to the one (1) position and the second format switcher is set to the two (2) position. In this event, the contents of the data traversing in the first format switcher is set to sink to the high definition multimedia interface. In the fourth column, the final command pathway functionality of the first embodiment of the disclosed invention, both format switchers are set to the one (1) position. In this event, the contents of the first, engaged, format switcher is sent directly to the port of the second, engaged, format switcher. The ARC decoder, 520 is engaged upon reception of the ARC HEAC RxD media propagated in said configuration.

Figure 10:
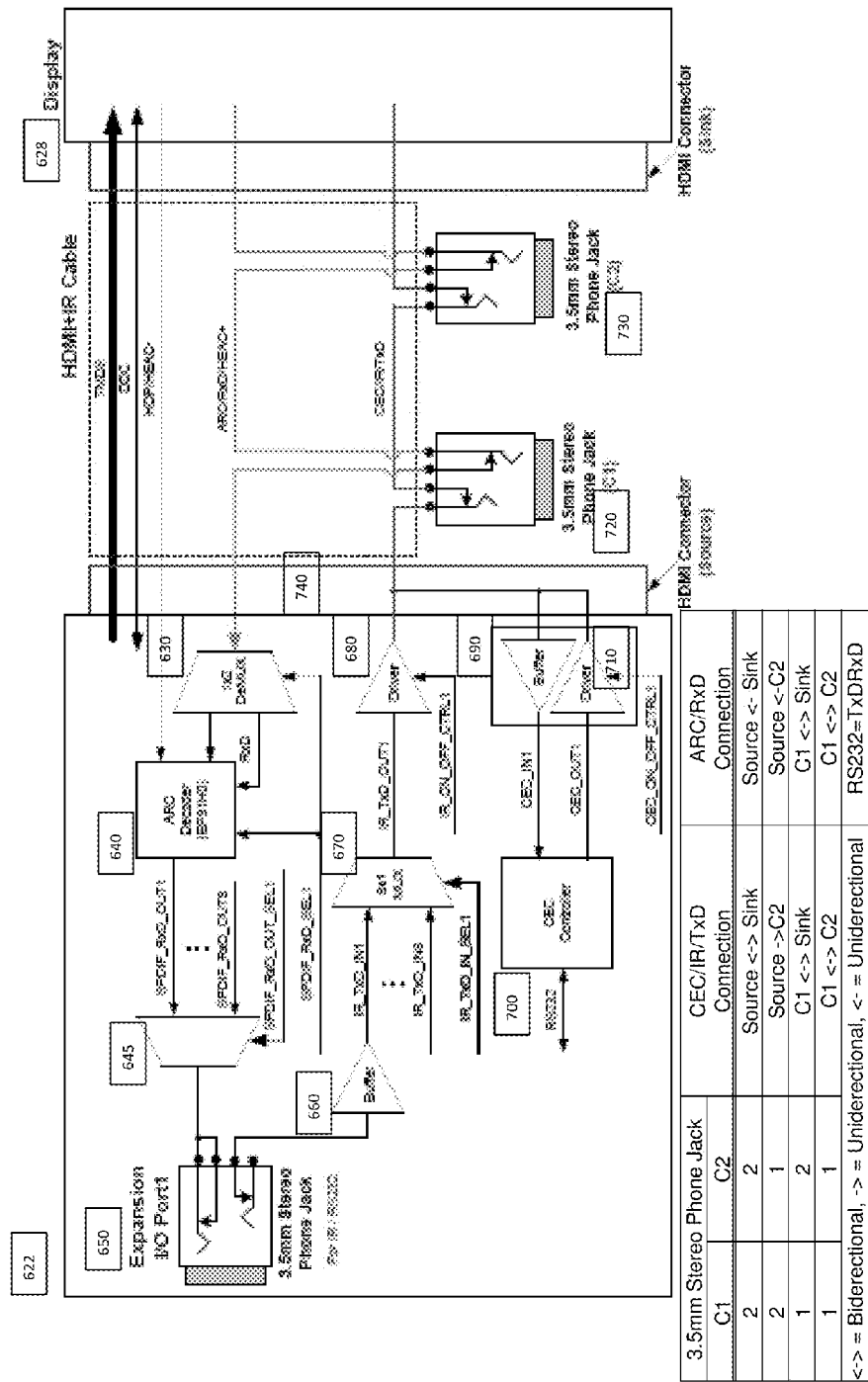
FIG. 10: Is a schematic view of a ninth embodiment of the disclosed invention wherein a command platform router is integrated upon connective circuitry connected with a variant format high definition multimedia interface modified by at least a mono audio format switcher, the stereo audio format switcher electrically connected with a port capable of insertion upon the modified high definition multimedia interface.

530 is a is a 3.5 millimeter stereo audio phone jack, the is a 3.5 millimeter stereo audio phone jack an interface port with an manual stereo format switcher which is connected upon connective circuitry which has interconnection with an variant high definition multimedia interface, the variant high definition multimedia interface, variant upon connection with at least a data command packet of at least a standard control signal exemplified as consumer electronics control of infrared signal, RS-232, and derivative transmission signal (TxD) and derivative reception signal (RxD). The is a 3.5 millimeter stereo audio phone jack has interconnection with a variant high definition multimedia interface, the variant high definition multimedia interface, variant by the configuration of the stereo phone jack configuration described by FIG. 10 reference numeral table. FIG. 10 reference numeral table, is a table of connections pathways taken within the high definition multimedia interface variant upon the position of the stereo switch. The pathways associated with the positions of the stereo switch is described in the table. The first column show the control pathway taken when both switches are in the two (2) position. When the format switcher is set into the 2 position on either side of the format switcher, integrated upon the high definition multimedia interface, the source is set to sink to the high definition multimedia interface, in addition to the source being set to sink to the high definition multimedia interface, the source is set to sink. The second column describes when the first format switcher is set to the two (2) position and the second format switcher is set to the one (1) position. In this event, the source is set to the control format of the second format switcher. In addition to the source being set to the control format of the second format switcher, the TxD is transmitted from the source to the second format switcher and the RxD is transmitted from the second format switcher to the source. The third column describes the control pathways taken when the first format switcher is set to the one (1) position and the second format switcher is set to the two (2) position. In this event, the contents of the data traversing in the first format switcher is set to sink to the high definition multimedia interface. In addition to, the contents of the data traversing from the first format switcher is set to sink to the high definition multimedia interface, the TxD is transmitted from the source to the format switcher and the RxD is transmitted from the first format switcher to the source. In the fourth column, the final command pathway functionality of the first embodiment of the disclosed invention, both format switchers are set to the one (1) position. In this event, the contents of the first, engaged, format switcher is sent directly to the port of the second, engaged, format switcher. In addition to the contents of the first, engaged, format switcher being sent directly to the port of the second, engaged, format switcher, the RxD is sent along one channel of the stereo line dedicated to high definition multimedia interface ethernet audio control (HEAC) whilst the TxD is sent along the second channel of the stereo line dedicated to IRCEC. 530 3.5 millimeter stereo audio phone jack engages the connection pathways presented by the configuration of the manual switch described. 540 is a buffer integrated upon connective circuitry having interconnection with the stereo format switcher port as well as a multiplexer. The buffer stores temporary infrared memory associated with at least a data packet of at least a variant control platform in order to send a timed signal to the multiplexer. 550 is a multiplexer herein referenced in FIG. 2 with the driver buffered signal herein referenced as FIG. 2 reference numeral 55. The multiplexer taking a variant infrared control signal, herein referenced as FIG. 2 reference numeral 55 is interconnected upon connective circuitry having connection with a driver and the buffer. 560 is an infrared driver interconnected with connective circuitry having connection with a mono 3.5 mm port, the said multiplexer, and a consumer electronics control buffer, driver circuit. The infrared driver is used to regulate the current transferred from the multiplexer in order to control the flow of the infrared data packets in an on, off, or variant control mode. The driver regulates the current of the infrared command packets. 565 is a consumer electronics control integrated buffer, driver circuit electrically connected upon connective circuitry having connection with the infrared driver, with the at least a 3.5 mm mono phone jack, and the consumer electronics control controller. 570 is a buffer integrated within the consumer electronics control integrated buffer, driver circuit, integrated upon connective circuitry having interconnection with a consumer electronics control controller, a consumer electronics control driver, and at least one of the mono 3.5 mm ports. The buffer stores temporary consumer electronics control memory associated with at least a data packet of at least a consumer electronics control of infrared control platform in order to send a timed signal to the consumer electronics control controller. 580 is a consumer electronic control controller integrated upon connective circuitry having interconnection with the said consumer electronics control buffer and a consumer electronics control driver modified with an RS-232 reader. The consumer electronics control controller, is a consumer electronics control command platform generator of at least a data packet of consumer electronics control. The consumer electronics control controller has interconnection with the consumer electronics control buffer driver circuit. 590 is a consumer electronics control driver integrated upon the consumer electronics control buffer, driver circuit; having connection with connective circuitry. The consumer electronics control driver is a consumer electronics control driver having connection with the consumer electronics control controller as well as a consumer electronics control of infrared media situated within a high definition multimedia interface. The consumer electronics control media is a 3.5 mm mono phone jack. The driver regulates the flow of consumer electronics control command packets by regulating the current of consumer electronics control packets. The consumer electronics control driver setting is set to consumer electronics control on mode which leads the driver to transmit consumer electronics control command packets to the consumer electronics control of infrared media situated within the high definition multimedia interface. The consumer electronics control driver setting is set to consumer electronics control off mode which leads the driver to disable transmission of consumer electronics control command packets to the consumer electronics control of infrared media situated within the high definition multimedia interface. The consumer electronics control driver setting is set to consumer electronics control control mode which leads the driver to transmit varient current consumer electronics control command packets to the consumer electronics control of infrared media situated within the high definition multimedia interface. 610 is a 3.5 millimeter or seven halves millimeter mono audio phone jack is a format switcher having an entangled connection with the high definition multimedia interface and 620 which a 3.5 millimeter or seven halves millimeter mono audio phone jack is a format switcher having an entangled connection with the high definition multimedia interface and 610.

FIG. 10: Is a schematic view of a ninth embodiment of the disclosed invention wherein a command platform router is integrated upon connective circuitry connected with a variant format high definition multimedia interface modified by at least a mono audio format switcher, the stereo audio format switcher electrically connected with a port capable of insertion upon the modified high definition multimedia interface. 622 is connective circuitry integrated with a port modified for insertion upon a variant high definition multimedia interface. The port an medium, capable of insertion with a medium carrying standard at least a command packet, command packet media, in which a high definition multimedia interface is connected upon the port connected with a is a 3.5 millimeter stereo audio phone jack. 628 is a display modified with a command input port, the command input port a gateway for standard audio video command platforms of at least a data command packet. The modified command input port is a multiple platform capable command input port wherein the at least a data packet of at least a command platform, which includes the list of, infrared command platform, RS-232 command platform, TCPIP command platform, Dolby digital audio command platform, digital audio command platform, and composite video command platform; are platform command packets on which the multiple platform capable command input port has first interface with a variant high definition multimedia interface, the variant high definition multimedia interface variant upon RxD and TxD transmission. RxD is a variant control standard modified by the stereo format switcher situated within the high definition multimedia interface. The standard is modified to carry audio receiver channel, high definition multimedia interface ethernet audio control (HEAC), and derived receiver signals (RxD) therefrom. The signal derived receiver signal (RxD) is present as a standard interference of the control signal being pushed into the cable. TxD is a variant control standard modified by the format switcher situated within the high definition multimedia interface. The line is modified to carry consumer electronics control, infrared, and derived transmitter signals (TxD) therefrom. The signal derived transmitter signal (TxD) is present as a standard interference of the control signal being pushed into the cable, the said control signal being a consumer electronic control of infrared signal. 630 is a demodulator electrically connected to connective circuitry having interface with the variant high definition multimedia interface interconnected with the audio return channel decoder. The demodulator switches between the command packet formats as they are received reducing the variant high definition multimedia interface to the audio return channel standard. 640 is an audio return channel decoder electrically connected to connective circuitry directly connected to the demodulator as well as an SPDIF modulator. The audio return channel (ARC) decoder is a transcriber of at least a data command pack, modified to transcribe at least an SPDIF signal to an SPDIF modulator. 645 is an SPDIF modulator electrically connected upon connective circuitry having connection with the audio return channel decoder in addition to having a connection with a 3.5 mm stereo phone jack expansion input/output port. The SPDIF modulator is modified to select at least one of a plethora of SPDIF channels in order to create a variably times variant signal. 650 is an 3.5 mm stereo phone jack expansion input/output port interconnected with a SPDIF modulator and a Infrared and RS232 buffer. The 3.5 mm stereo phone jack expansion input/output port is a manual format switcher for infrared and RS232. 660 is an infrared and derivative transmission channel buffer electrically connected upon connective circuitry having connection with the 3.5 mm stereo phone Jack as well as a eight to 1 infrared derivative transmission channel multiplexer. The buffer stores temporary infrared, and infrared derivative transmission memory associated with at least a data packet of at least a variant control platform in order to send a timed signal to the multiplexer. 670 is an eight to one signal infrared transmission channel multiplexer, electrically connected upon connective circuitry, having connection with the infrared buffer and an infrared transmission driver. The eight to one signal infrared transmission channel multiplexer switches in a rapid times sequence between the infrared data packs driven from the buffer. The eight to one signal infrared transmission channel multiplexer switches between infrared derivative transmission challens IR_TxD sending a timed infrared data pack to a infrared driver. 680 is a infrared driver electrically connected to connective circuitry having connection with a 3.5 mm stereo phone jack port as well as an integrated consumer electronics control integrated buffer, driver circuit. The infrared driver transmits varent current infrared command packets is dependent on the connection made upon the 3.5 mm stereo phone jack. 690 is a consumer electronics control integrated buffer, driver circuit electrically connected upon connective circuitry having connection with the infrared driver, with the at least a 3.5 mm mono phone jack, and the consumer electronics control controller. 690 is a buffer integrated within the consumer electronics control integrated buffer, driver circuit, integrated upon connective circuitry having interconnection with a consumer electronics control controller, a consumer electronics control driver, and at least one of the mono 3.5 mm ports. The buffer stores temporary consumer electronics control memory associated with at least a data packet of at least a consumer electronics control of infrared control platform in order to send a timed signal to the consumer electronics control controller. 700 is a consumer electronic control controller integrated upon connective circuitry having interconnection with the said consumer electronics control buffer and a consumer electronics control driver modified with an RS-232 reader. The consumer electronics control controller, is a consumer electronics control command platform generator of at least a data packet of consumer electronics control.

The consumer electronics control controller has interconnection with the consumer electronics control buffer driver circuit. 710 is a consumer electronics control driver integrated upon the consumer electronics control buffer, driver circuit; having connection with connective circuitry. The consumer electronics control driver is a consumer electronics control driver having connection with the consumer electronics control controller as well as a consumer electronics control of infrared media situated within a high definition multimedia interface. The consumer electronics control media is a 3.5 mm stereo phone jack. The driver regulates the flow of consumer electronics control command packets by regulating the current of consumer electronics control packets. The consumer electronics control driver setting is set to consumer electronics control on mode which leads the driver to transmit consumer electronics control command packets to the consumer electronics control of infrared media situated within the high definition multimedia interface. The consumer electronics control driver setting is set to consumer electronics control off mode which leads the driver to disable transmission of consumer electronics control command packets to the consumer electronics control of infrared media situated within the high definition multimedia interface. The consumer electronics control driver setting is set to consumer electronics control control mode which leads the driver to transmit varient current consumer electronics control command packets to the consumer electronics control of infrared media situated within the high definition multimedia interface. 720 is a 3.5 millimeter or seven halves millimeter stereo audio phone jack is a format switcher having an entangled connection with the high definition multimedia interface and 620 which a 3.5 millimeter or seven halves millimeter stereo audio phone jack is a format switcher having an entangled connection with the high definition multimedia interface and 740.

We claim:

1. A system for controlling a plurality of components, the system comprising:
    a format switcher having:
        a plurality of input ports configured to receive a plurality of data packets having different formats, including a data packet having an infrared format, to control audio/video parameters of the plurality of components,
        at least one output port,
        circuitry configured to format at least a portion of the plurality of data packets to be transmitted using a consumer electronics control standard and to multiplex the formatted plurality of data packets to be transmitted to at least a portion of the plurality of components;
    a high-definition multimedia interface medium coupled to the at least one output port of the format switcher and having a consumer electronics control channel for transmitting the formatted plurality of data packets; and
    a receiving device coupled to the high-definition multimedia interface medium and configured to receive the formatted plurality of data packets and to transmit control signals to respective plurality of components based on the audio/video parameter transmitted in the formatted data packets,
    wherein the format switcher further includes a timing circuit configured to inhibit, by signal timing differentials, consumer electronics control to transmit infrared signals via the high-definition multimedia interface medium.

2. The system according to claim 1, wherein the format switcher includes a band pass filter configured to inhibit consumer electronics control signals from being transmitted via the consumer electronics control channel to transmit the formatted plurality of data packets via the high-definition multimedia interface medium.

3. The system according to claim 1, wherein the format switcher further comprises a low pass filter configured to inhibit the infrared signals from being transmitted via the consumer electronics control channel to transmit a consumer electronics control signal via the high-definition multimedia interface medium.

4. The system according to claim 1, wherein the plurality of data packets includes an infrared command packet.

\* \* \* \* \*